Patented Mar. 11, 1924.

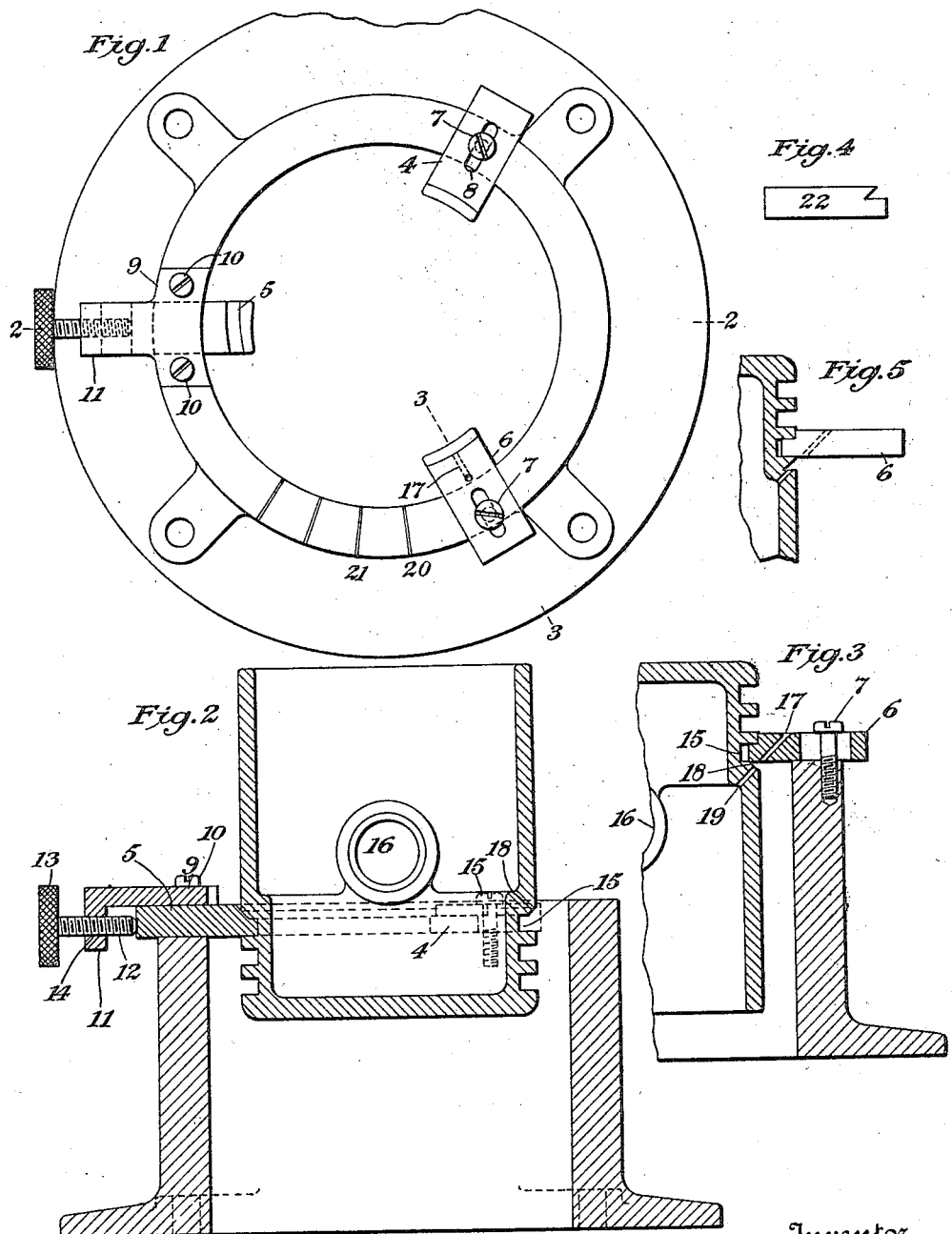

1,486,193

UNITED STATES PATENT OFFICE.

JOHN J. McGUCKIN, OF BROOKLYN, NEW YORK, ASSIGNOR TO LOUIS SCHWAB, OF NEW YORK, N. Y., DOING BUSINESS AS STEVENS & COMPANY.

APPLIANCE FOR CUTTING AND DRILLING PISTON HEADS.

Application filed May 6, 1922. Serial No. 559,033.

*To all whom it may concern:*

Be it known that I, JOHN J. McGUCKIN, a citizen of the United States, residing at Brooklyn, Kings County, New York, have invented certain new and useful Improvements in Appliances for Cutting and Drilling Piston Heads, of which the following is a specification.

My invention relates to an appliance for use in cutting a bevel or groove in or near the ring groove of the piston head of an internal combustion engine, and to means for drilling holes at the proper angle and positions, from the bevel or groove, so that excess oil which may accumulate near the piston ring may be gathered above the bevel, or in the groove and drawn off through the holes into the inside of the piston head, so that it will not work up past the piston ring into the combustion chamber.

And the object of my invention is to produce an appliance by the use of which the two operations of cutting and drilling the piston head may be conveniently and accurately performed in a satisfactory manner.

In the drawings Fig. 1 is a plan view; Fig. 2 is a vertical sectional view on the line 2—2 of Fig. 1 and showing in section a piston head positioned in the appliance; Fig. 3 is a similar view of one side of the appliance, taken as on the line 3—3 of Fig. 1, and showing part only of the appliance and piston head, the latter being reversed from its position in Fig. 2; Fig. 4 is a detail, showing a modified form of a cutter; and Fig. 5 is another detail illustrating the relation of the jig to a groove in the piston head.

The body of the appliance consists of a circular casting 1 or the like having a central bore of sufficient size to receive a cylinder head, and of sufficient depth to accommodate it in two positions for the appropriate operations.

At the upper edge of the body are mounted three adjustable elements 4, 5, 6, which are adapted to register against the cylinder head, or in one of its grooves. The guide 4 is secured by a suitable fastening, such as the set screw 7 passing through a slot 8 in the guide and being threaded into the body, so that the guide 4 may slide in or out toward the center of the appliance. A seat may be formed in the upper edge of the body for the guide to slide in.

A similar seat is formed to receive the cutter 5, which is held in place by a cap 9 secured by suitable screws 10 threaded into the upper end of the appliance. The cutter 5 has a turned down flange 11, through which passes a shank of an adjustment screw 12 provided with a suitable hand wheel 13, the screw 12 being threaded into a hole 14 in the body 1.

By screwing the adjustment screw in or out, the cutter may be projected into or withdrawn from the bore of the body.

The element 6 serves both as a guide, and as a jig for the drill with which the proper drain holes are to be made through the cylinder head. Thus, when the cylinder head is in the position shown in Fig. 2, the element 6 registers within the ring groove 15 so as to cooperate with the guide 4, also registering in that ring groove. And when the parts are in this position the cutter 5 will engage at the then upper exterior angle of the groove; and by turning the head, which can readily be done by means of a suitable tool inserted through the wrist pin hole 16, the material of the head at the angle referred to may be pressed against the cutter 5 and gradually bevelled off by forcing in the cutter, with the hand wheel 13, as the piston head is rotated.

When the desired bevel has been formed, the cutter is withdrawn, and the guide 4 and jig 6 are slacked off, the piston head taken out of the body and reversed into the position shown in Fig. 3. This will bring the guide hole 17 above the bevel 18 in proper relation to guide a drill to form a hole 19 from the bevel into the interior of the piston head.

When one hole has been drilled the piston head may be given a partial rotation, to the extent of which may be regulated by reference to the index marks 18 to 21, or other suitable registration marks, so as to space the holes properly and another hole may then be drilled, and others as desired.

It will be understood that the jig 6 may be made adjustable in and out, like the guide 4, if that is found to be desirable.

By means of my improvements I secure an appliance by the use of which the operations of bevelling an angle of a ring groove and of drilling drain holes may be readily and accurately performed so as to secure satisfactory results.

I wish to point out also that if the bevel of the cutter is reversed, it will cut a groove into the cylinder outside of the ring groove; and that by making suitable adjustments in the jig 6 and the guide 4, drain holes may be drilled from the groove into the inside of the piston head. Such a modified form of cutter is shown in Fig. 4 and designated by the numeral 22; while the relation of the jig to the groove is indicated in Fig. 5. It is sometimes considered desirable to form a groove and drains in this way, instead of by bevelling off one angle of the ring groove as first suggested.

It will be understood by those familiar with the art that details of my apparatus may be modified, as by the use of equivalents, without departing from the spirit of my invention as claimed.

Having thus described my invention what I claim and desire by Letters Patent of the United States is:—

1. An appliance for cutting and drilling piston heads, embodying a body, adjustable guides, one thereof provided with drill guiding means and an adjustable cutter.

2. An appliance for cutting and drilling piston heads, embodying a tubular body, radially adjustable guides, one thereof being provided with drill guiding means, and an adjustable cutter.

3. An appliance for cutting and drilling piston heads, embodying a body, adjustable guides, one thereof being provided with a drill guide hole, and a cutter.

4. An appliance for cutting and drilling piston heads, embodying a piston head supporting body, a cutter adapted to operate on the exterior surface of the piston head, and a guide provided with a drill guide hole therein adapted to be brought into registering relation with a cut portion of the cylinder head when the latter is reversed from its initial position in the appliance.

JOHN J. McGUCKIN.